(12) United States Patent
Yanning et al.

(10) Patent No.: US 7,787,636 B1
(45) Date of Patent: Aug. 31, 2010

(54) FILTERING A MICROPHONE SIGNAL TO REMOVE NOISE COMPONENTS GENERATED BY A DISK DRIVE

(75) Inventors: Liu Yanning, Fremont, CA (US); Ben Chang, Cupertino, CA (US); Babu Rahman, Fremont, CA (US); Timothy Glassburn, Milpitas, CA (US); Erhard Schreck, San Jose, CA (US)

(73) Assignee: Seagate Technology, LLC, Scotts Valley, CA (US)

( * ) Notice: Subject to any disclaimer, the term of this patent is extended or adjusted under 35 U.S.C. 154(b) by 1243 days.

(21) Appl. No.: 11/348,057

(22) Filed: Feb. 6, 2006

Related U.S. Application Data (60) Provisional application No. 60/709,910, filed on Aug. 19, 2005.

(51) Int. Cl.
*A61F 11/06* (2006.01)
*H03B 29/00* (2006.01)
*H04R 3/00* (2006.01)
*H04B 15/00* (2006.01)

(52) U.S. Cl. .................. 381/71.1; 381/71.7; 381/92; 381/94.1; 381/94.2

(58) Field of Classification Search ............... 381/94.7, 381/94.2, 71.1, 71.7, 92, 94.1; 375/295; 455/550.1; 704/226
See application file for complete search history.

(56) References Cited

U.S. PATENT DOCUMENTS

| | | | |
|---|---|---|---|
| 5,388,160 A * | 2/1995 | Hashimoto et al. | 381/71.14 |
| 6,741,659 B1 * | 5/2004 | Chan et al. | 375/295 |
| 7,277,722 B2 * | 10/2007 | Rosenzweig | 455/550.1 |
| 2005/0234715 A1 * | 10/2005 | Ozawa | 704/226 |

* cited by examiner

*Primary Examiner*—Vivian Chin
*Assistant Examiner*—Friedrich Fahnert
(74) *Attorney, Agent, or Firm*—Westman, Champlin & Kelly, P.A.

(57) ABSTRACT

A sound recording device includes a disk drive, a microphone, and a controller. The disk drive writes data on a rotatable data storage disk therein. The microphone generates a microphone signal which includes a desired sound component and a noise component from noise that is generated by the disk drive. The controller filters the microphone signal to reduce the noise component from the disk drive relative to the desired sound component, and writes the filtered microphone signal on the disk. Accordingly, noise from the disk drive can be attenuated during recording by the sound recording device.

21 Claims, 5 Drawing Sheets

FILTERING A MICROPHONE SIGNAL TO REMOVE NOISE COMPONENTS GENERATED BY A DISK DRIVE

RELATED APPLICATION

This application claims the benefit of and priority to U.S. Provisional Patent Application No. 60/709,910, filed Aug. 19, 2005, the disclosure of which is hereby incorporated herein by reference as if set forth in its entirety.

FIELD OF THE INVENTION

The present invention generally relates to sound recording devices and, more particularly, to such devices that record sound on a disk drive.

BACKGROUND OF THE INVENTION

Disk drives are increasingly being used in sound and video recording devices such as MP3 players and camcorders to store information. It is now possible in a compact disk drive to store and retrieve large amounts of data in a fast and efficient manner. A typical magnetic disk drive includes one or more magnetic recording disks which are mounted to a rotatable hub of a spin motor and rotated at a high speed. An array of read/write heads is disposed adjacent to surfaces of the disks to transfer data between the disks and a host device. The heads can be radially positioned over the disks by a rotary actuator and a servo system, and can fly proximate to the surfaces of the disks upon air bearings. Other types of disk drives used in recording devices include optical drives which can retrievably write data on, for example, Compact Disks (CD) and/or Digital Video Disks (DVD).

Incorporating a disk drive within a sound/video recording device can present challenges. Portable recording devices are typically battery powered, so it is desired that their components consume low average power. Because disk drives have many moving parts (e.g., spinning disk(s), rotary actuator, and servo system), they can consume a relative high amount of power while operating. In an attempt to conserve power, some recording devices turn the disk drive off when it is not being used to read/write data. The moving parts of a disk drive cause vibration during operation, and toggling a disk drive on and off can further contribute to vibration from the disk drive. Such vibration and associated sound can be undesirable in sound/video recording devices.

SUMMARY OF THE INVENTION

In some embodiments of the present invention, a sound recording device includes a disk drive, a microphone, and a controller. The disk drive writes data on a rotatable data storage disk therein. The microphone generates a microphone signal which includes a desired sound component and a noise component from noise that is generated by the disk drive. The controller filters the microphone signal to reduce the noise component from the disk drive relative to the desired sound component, and writes the filtered microphone signal on the disk. Accordingly, noise from the disk drive can be attenuated during recording by the sound recording device.

In some further embodiments, the controller includes a notch filter that is configured to attenuate the microphone signal within one or more frequency bands that are defined based on characteristics of noise generated by the disk drive. For example, the notch filter may be configured to attenuate the microphone signal at least at a fundamental frequency of noise generated during spin up of the disk from rest to an operational speed and/or during spin down of the disk from the operational speed to rest, during seeking of a head of the disk drive between tracks on the disk, during latching of the head to prevent its movement relative to the disk, and/or during unlatching of the head. The notch filter may have a variable notch frequency for attenuation, and the controller may be configured to vary the notch frequency to correspond to changes in the frequency of the noise component as, for example, the disk is spun up from rest to the operational speed.

In some further embodiments, the controller is configured to initiate and/or cease filtering of the microphone signal in response to changes in operational phases of the disk drive (e.g., unlatching and spin up, read/write commands, sleep, spin down and latching). Initiating and/or ceasing filtering may also be carried out in response to other defined events which may be observable by a host and which may include: commanding the disk drive to read/write data on the disk and/or timer based events (e.g., stop filtering of spin-up noise after expiration of a defined time following initiation of spin-up). When the disk drive has a small buffer, the operational phase of the disk drive may be estimated by the host device based on the timing of read/write commands it provides thereto.

Some other embodiments of the present invention are directed to related methods of operating a sound recording device to filter the noise component of the microphone.

DETAILED DESCRIPTION OF THE INVENTION

The present invention now will be described more fully hereinafter with reference to the accompanying drawings, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the figures and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the term "and/or" includes any and all combinations of one or more of the associated listed items. It will be understood that, although the terms first, second, etc. may be used herein to describe various elements and/or regions, these elements and/or regions should not be limited by these terms. These terms are only used to distinguish one element/region from another element/region. Thus, a first element/region discussed below could be termed a second element/region without departing from the teachings of the present invention.

The present invention may be embodied in hardware and/or in software (including firmware, resident software, microcode, etc.). Consequently, as used herein, the term "signal" may take the form of a continuous waveform and/or discrete value(s), such as digital value(s) in a memory or register.

The present invention is described below with reference to block diagrams of sound recording devices that include one or more disk drives and related sound recording circuits and methods according to various embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Figure 1:
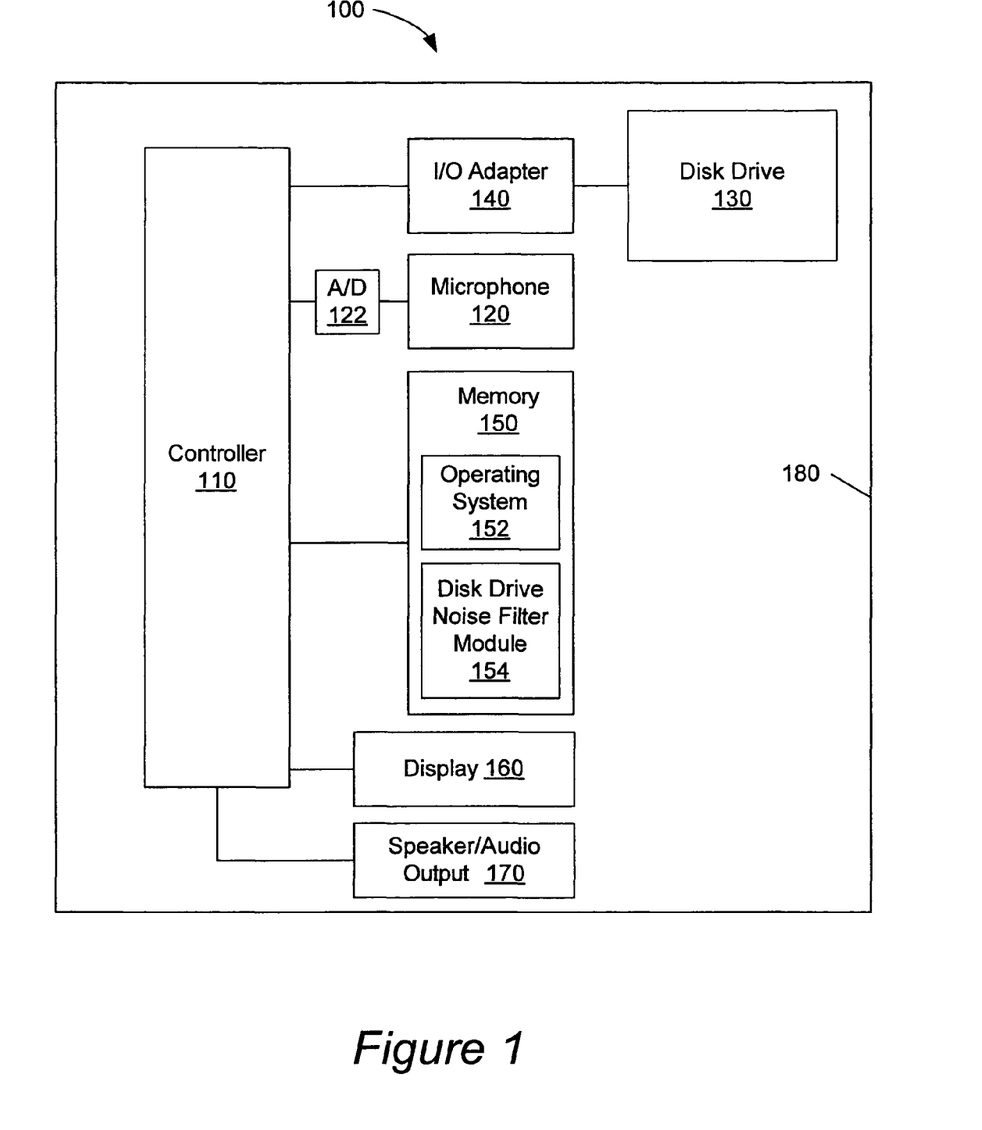
FIG. 1 is a block diagram of a sound recording device with a disk drive and that is configured in accordance with some embodiments of the present invention.

FIG. 1 illustrates a simplified diagrammatic representation of a sound recording device, generally designated as 100, which is configured in accordance with some embodiments of the present invention. The recording device 100 includes a controller 110, microphone 120, disk drive 130, input/output (I/O) adapter 140, memory 150, display 160, and speaker/audio output 170 which are enclosed within a common housing 180. The recording device 100 is configured via an operating system 152 to record sound that is sensed by the microphone 120 onto the disk drive 130. More particularly, the microphone 120 generates a microphone signal which is sampled by an analog-to-digital (A/D) converter 122 to generate a sampled digital signal. The sampled signal is further processed by the controller 110 and written to the disk drive 130 through the I/O adapter 140. The memory 150 can also serve as a buffer in which the microphone signal is recorded until a threshold amount of data is recorded therein to allow efficient writing as a block to the disk drive 130.

As used herein, the term "sound recording device" refers to any type of electronic device that is configured to record sound onto a disk drive, and includes, but is not limited to, audio recorders that utilize a standard audio encoding protocol (e.g., MP3, Windows Media Audio, WAV) such as portable audio players and camcorders. Although an exemplary embodiment of a disk drive that uses magnetic data storage disk(s) is shown in FIG. 2 for purposes of explanation, it is to be understood that embodiments of the present invention are not limited thereto and instead can include, but are not limited to, disk drives that use other types of data storage disks, such as an optical data storage disk and/or a magneto-optical data storage disk.

Figure 2:
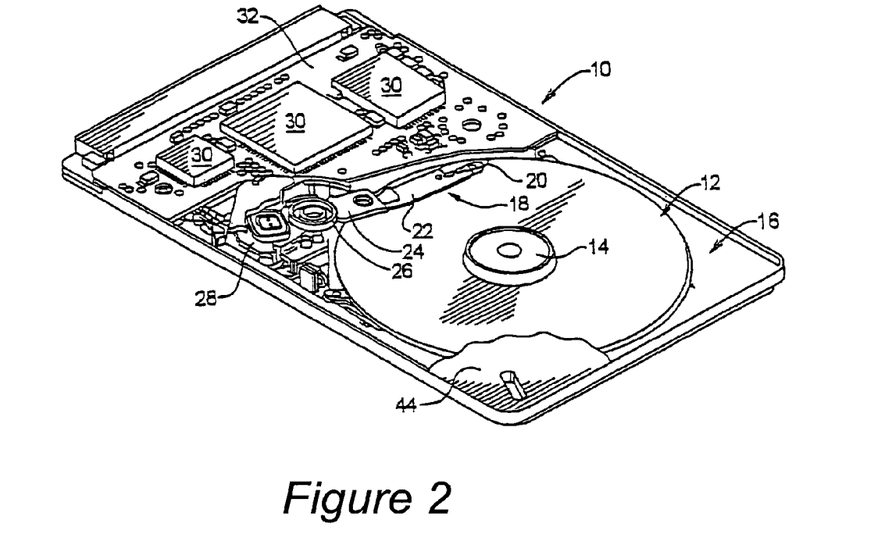
FIG. 2 is a perspective view of the disk drive of FIG. 1 in accordance with some embodiments of the present invention.

Referring to FIG. 2, an exemplary magnetic disk drive 10, which can be used as the drive 130 in FIG. 1, can include one or more data storage disks 12 (illustrated as a single disk in FIG. 1) that is rotated by a spin motor 14. The spin motor 14 and an actuator arm assembly 18 are mounted to a base plate 16. The actuator arm assembly 18 includes a head 20 mounted to a flexure arm 22 which is attached to an actuator arm 24 so as to rotate about a pivot bearing assembly 26. An actuator motor (e.g., voice coil motor) 28 moves the actuator arm assembly 18 and, thereby, the head 20 relative to the disk stack 12. The spin motor 14, actuator motor 28, and actuator arm assembly 18 are coupled to a controller and associated electronic circuits 30 mounted to a printed circuit board 32. The controller 30 is configured to move the head 20 between concentric tracks (or cylinders) on the disk 12 (via seek operations) to read/write data responsive to commands from the controller 110 of the sound recording device 100. To conserve power, the controller 30 can also spin up the disk 12 from rest to an operational speed and can spin down the disk 12 to rest in response to commands from the controller 110. While spinning down the disk 12, the controller 30 can be configured to move the head 20 to a park location where the actuator arm assembly 18 can be releasably latched to prevent movement relative to the disk 12.

The moving parts (e.g., spin motor 14, disk 12, actuator motor 18, and rotary actuator assembly 18) of the disk drive 10 cause vibration during operation. The noise from the vibration may not be sufficiently loud to be objectionable to a user during playback of an audio file (e.g., voice and/or music) from the disk drive 130 of the recording device 100. However, because the microphone 120 and disk drive 130 are enclosed within the common housing 180, the sound from the disk drive 130 can be channeled by the housing 180 and components therein to the microphone 120 during recording so that the microphone signal can include a noise component that is unacceptably high relative to a desired sound component (i.e., voice/music that a user intends to record). Moreover, the spin motor 14, actuator motor 18, and/or other electrical components of the disk drive 10 may induce electrical noise into the analog microphone signal before it is digitized by the A/D converter 122. This electrical noise can be related to the operational phase of the disk drive 10, such as during spin up/spin down of the disk 12 and the related current spike through the spin motor 14 and/or during seeking of the head 20 and related current spike through the actuator motor 18. Accordingly, as used herein, the term "noise" refers to sound caused by disk drive 10 components which the microphone 120 senses and combines into the microphone signal and to electrical noise that disk drive 10 components induce into the microphone signal.

The controller 110 is configured, by operations defined by a noise filter module 154, to form a filter that filters the microphone signal to reduce the noise component from the disk drive 130 relative to the desired sound component. As explained above, the controller 110 controls some of the operation of the disk drive 130 that results in the undesirable noise, such as initiating spin up, maintaining the disk 12 spinning at an operational speed, spin down of the disk 12, loading/unloading the head 20 between the disk 12 and a ramp and associated latching/unlatching of the actuator assembly 18, and/or seeking of the head 20 between tracks (referred to herein as operational modes). Consequently, the controller 110 can anticipate when the disk drive 130 will generate noise and the characteristics of the noise. For example, the spin up, load, idle, seeking, unload, and spin down operational modes of the disk drive 130 each generate noise having different amplitude and frequency characteristics.

In some embodiments, while recording sound through the microphone 120, the controller 110 can initiate and cease noise filtering of the microphone signal based on the operational mode of the disk drive 130. For example, the controller 110 may not filter the microphone signal while the disk drive 130 is in a sleep mode (disk 12 at rest and the actuator 18 latched), but may then initiate filtering before waking-up the disk drive 130 (i.e., causing the actuator to become unlatched and the disk 12 spun up to operational speed) to write data to the disk 12. The controller 110 may cease filtering the microphone signal once the disk 12 are spun up, or it may continue filtering to remove noise caused by the spin motor 14, actuator motor 28, and/or vibration of the actuator 18 while carrying out read/write commands. The controller 110 may selectively filter the microphone signal responsive to an activity level of the disk drive 130, such as based on it commanding the disk drive 130 to perform a threshold level of data I/O activity which is expected to generate at least a threshold amount of noise. Accordingly, the microphone signal can be selectively filtered during times when the disk drive 130 is expected to generate an objectionable level and/or frequency of noise.

In some further embodiments, the controller 110 forms a filter that has tunable filter characteristics that are adaptively tuned based on the operational mode of the disk drive 130 so as to substantially attenuate noise during that mode. The filter can be tuned to have first filter characteristics (e.g., first attenuation frequency bands) that substantially attenuates a noise component of the microphone signal caused by spin up of the disk 12 from rest to its operational speed, by unlatching of the actuator 18, and/or by loading of the head 20 onto the disk 12. The filter can then be tuned to have second filter characteristics (e.g., second attenuation frequency bands) that substantially attenuates a noise component of the microphone signal caused by the spin motor 14, the actuator motor 28, and/or vibration of the actuator 18 while carrying out read/write commands. The filter can then be tuned to have third filter characteristics (e.g., third attenuation frequency bands) that substantially attenuates a noise component of the microphone signal caused by unloading the head 20 off the disk 12, by latching of the actuator 18, and/or by spin down of the disk 12 from its operational speed to rest. Moreover, when a notch filter is used as the filter, its attenuation frequency band(s) may be varied over time to correspond to changes in the frequency of noise generated as the disk is spun up from rest to the operational speed and/or spun down to rest.

Thus, for example, the filter may be adapted as follows: 1) before commanding the disk drive 130 to wake-up, the microphone signal is filtered with the first filter characteristics; 2) after the disk 12 reaches operational speed the microphone signal is filtered with the second filter characteristics; and 3) before commanding the disk drive 130 to turn-off, the microphone signal is filtered with the third filter characteristics.

Different types of disk drives can have different noise characteristics due to, for example, different numbers of poles in their spin motors. Accordingly, the controller 110 may be configured to obtain an identifier from the disk drive that is indicative of noise characteristics of the disk drive 130, and to adapt its filtering of the microphone signal in response to the obtained identifier. More particularly, the controller 110 may query the disk drive 130 to determine its model number and from which it can determine its noise signature characteristics, or the disk drive 130 may more directly identify its noise signature characteristics to the controller 130. The controller 110 can then adapt its filtering in response to the determined noise signature characteristics of the disk drive 130.

Accordingly, the controller 110 can adapt how it filters the microphone signal in response to the operational mode and/or type of disk drive as predicted, sensed, and/or controlled by the controller 110 in an attempt to adapt to the time varying characteristics of the noise from the disk drive 130. Although filtering of the microphone signal has been described as being carried out by the controller 110, it is to be understood that the filtering may be at least partially carried out by analog circuitry, such as by filter circuitry connected between the microphone 120 and the A/D converter 122. Moreover, it is to be understood that at least some of the filtering described herein may be carried out within the disk drive 130, such as within controller circuits 30 therein.

Figure 3:
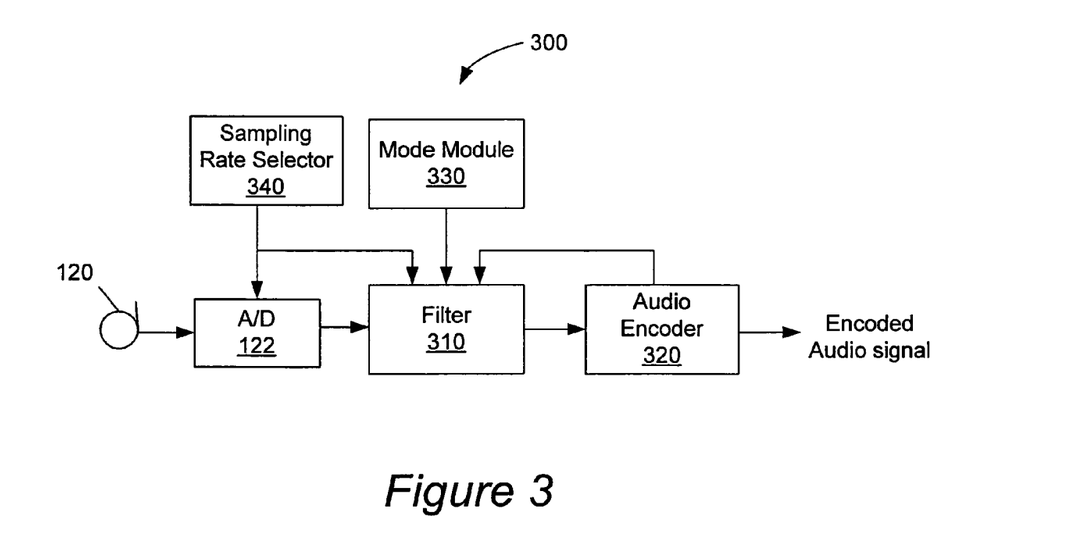
FIG. 3 is a block diagram of a sound recording circuit and associated methods in accordance with some embodiments of the present invention.

FIG. 3 is a simplified block diagram of a sound recording circuit 300 and related methods, a portion of which may be carried out by the controller 110 in accordance with some embodiments of the present invention. The A/D converter 122 samples the microphone signal to generate a digital microphone signal. The digital microphone signal is filtered by a filter 310 and then encoded by an audio encoder 320 to generate an encoded audio signal. The encoded audio signal is stored on the disk drive 130, and may be temporarily buffered in the memory 150 before it is written to the disk drive 130. The filter 310 can have tunable filter characteristics that are adaptively tuned, as explained above, by a mode module 330 in response to the operational mode of the disk drive 130. The mode module 330 may activate and deactivate filtering by the filter 310 so that, for example, the filter is not active (i.e., digital microphone signal is passed unfiltered to the audio encoder 320) when the disk drive 130 is in a sleep mode, and is active (i.e., digital microphone signal filtered and then encoded) when the disk drive 130 is active, for example, spinning up/down and/or reading/writing data.

The audio encoder 320 can be configured to encode the digital microphone signal with a coding rate that can be varied by the controller 110 (e.g., in response to a user selection). The audio encoder 320 may employ a standard audio coding protocol including, but not limited to, MP3, Windows Media Audio, WAV. The filter 310 can be configured to adapt its filtering (e.g., vary attenuation frequency bands) in response to a selected rate at which the audio encoder 320 codes the digital microphone signal. The encoded audio signal can be buffered in the memory 150 until a sufficient amount of data is present to allow efficient writing of data block(s) to the disk drive 130. As explained above, the filter 310 can be activated when data is being written to the disk drive 130, and can be adjusted to attenuate the time varying noise characteristics of the disk drive 130 (e.g., startup, writing, shut-down).

The A/D converter 122 can be configured to sample the microphone signal to generate the digital microphone signal at a rate that can be varied by a sampling rate selector 340 (e.g., in response to a user selection). The filter 310 can be configured to adapt its filtering (e.g., vary attenuation frequency bands) in response to a selected sampling rate of the A/D converter 122.

The filter 310 may include a notch filter that is configured to reduce amplitude of the digital microphone signal at one or more frequencies that are defined based on characteristics of the noise generated by the disk drive 130. The notch filter may be adjusted to filter at different selected frequencies in response to the operational mode of the disk drive 130. For example, the notch filter may filter at one or more fundamental frequencies and/or other harmonic frequencies of noise caused by unlatching of the actuator 18 and spin up of the disk 12. The notch filter can then be adjusted to filter at one or more fundamental frequencies and/or other harmonic frequencies of noise caused by seeking and other operations for reading/writing data on the disk 12. The notch filter can then be adjusted to filter at one or more fundamental frequencies and/or other harmonic frequencies of noise caused by maintaining the disk 12 at the operational speed and/or by spin up/down of the disk 12.

The controller 110 may be configured to sense and identify characteristics of the noise component from the disk drive in the microphone signal, and to adapt the filter 310 based on the identified noise characteristics to reduce the noise component. For example, the controller 110 can be configured to analyze the microphone signal to identify characteristics of the noise component from the disk drive, and to adapt the filtering of the microphone signal to reduce the noise component in response to the identified characteristics. The filtering may be adjusted to change of the attenuation frequency(ies) of the filter 310 based on the identified noise characteristics.

Figure 4:
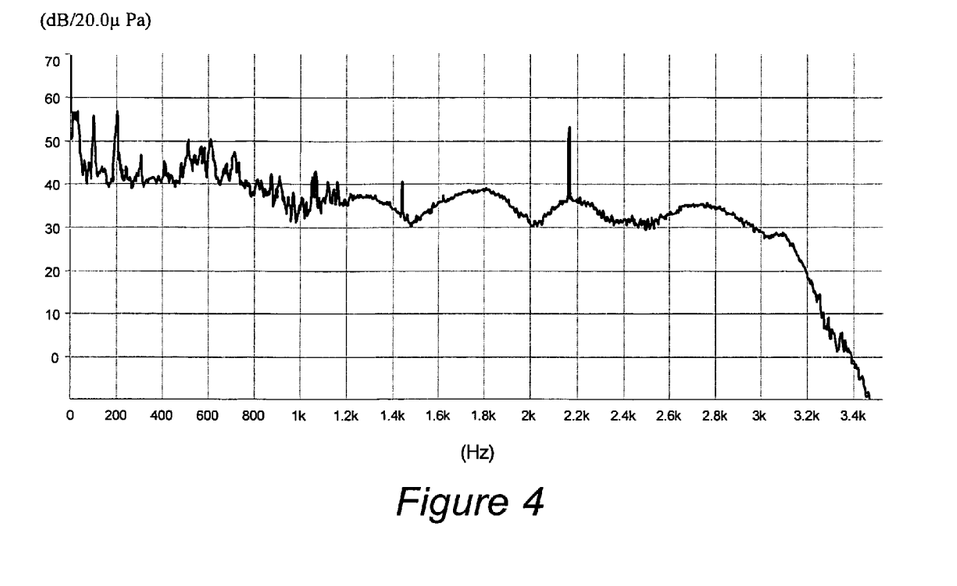
FIG. 4 is a graph of a simulation of magnitude relative to frequency of a microphone signal that includes a desired sound component and a noise component from a disk drive.
Figure 5:
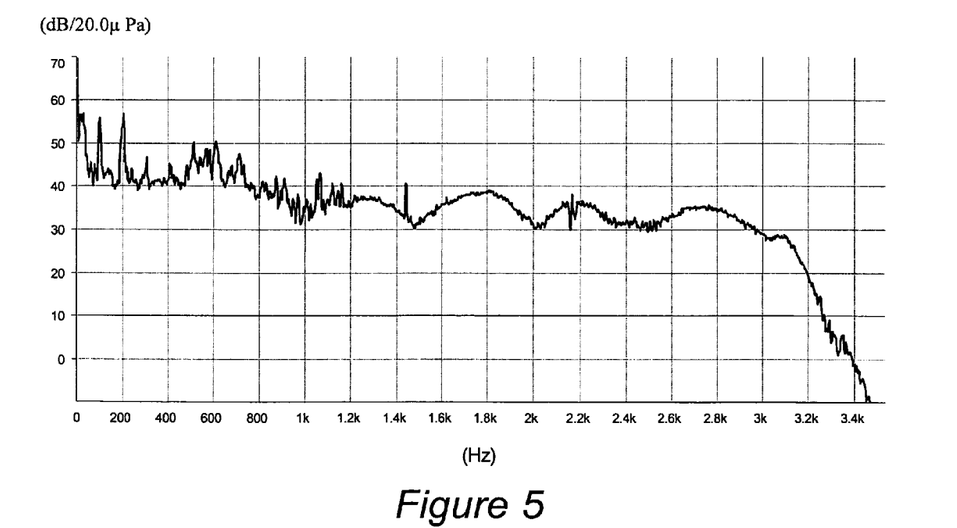
FIG. 5 is a graph of a simulation of magnitude relative to frequency of the microphone signal shown in FIG. 4 but which has been filtered by a notch filter to attenuate the noise component from the disk drive.

FIG. 4 is a graph of a simulation of magnitude relative to frequency of a microphone signal that includes a desired sound component and a noise component from a disk drive. As shown in FIG. 4, the microphone signal contains a noise spike at about 2 kHz due to commutation noise from a spin motor of the disk drive. FIG. 5 is a graph of a simulation of magnitude relative to frequency of the microphone signal shown in FIG. 4 but which has been filtered by a notch filter to attenuate the noise component from the disk drive. The notch filter has a narrow attenuation frequency band at about 2 kHz so that the commutation noise from the spin motor has been substantially attenuated in the microphone signal. Accordingly, noise from the disk drive has been substantially eliminated from the microphone signal and thereby improving recording from the sound recording device.

Figure 6:
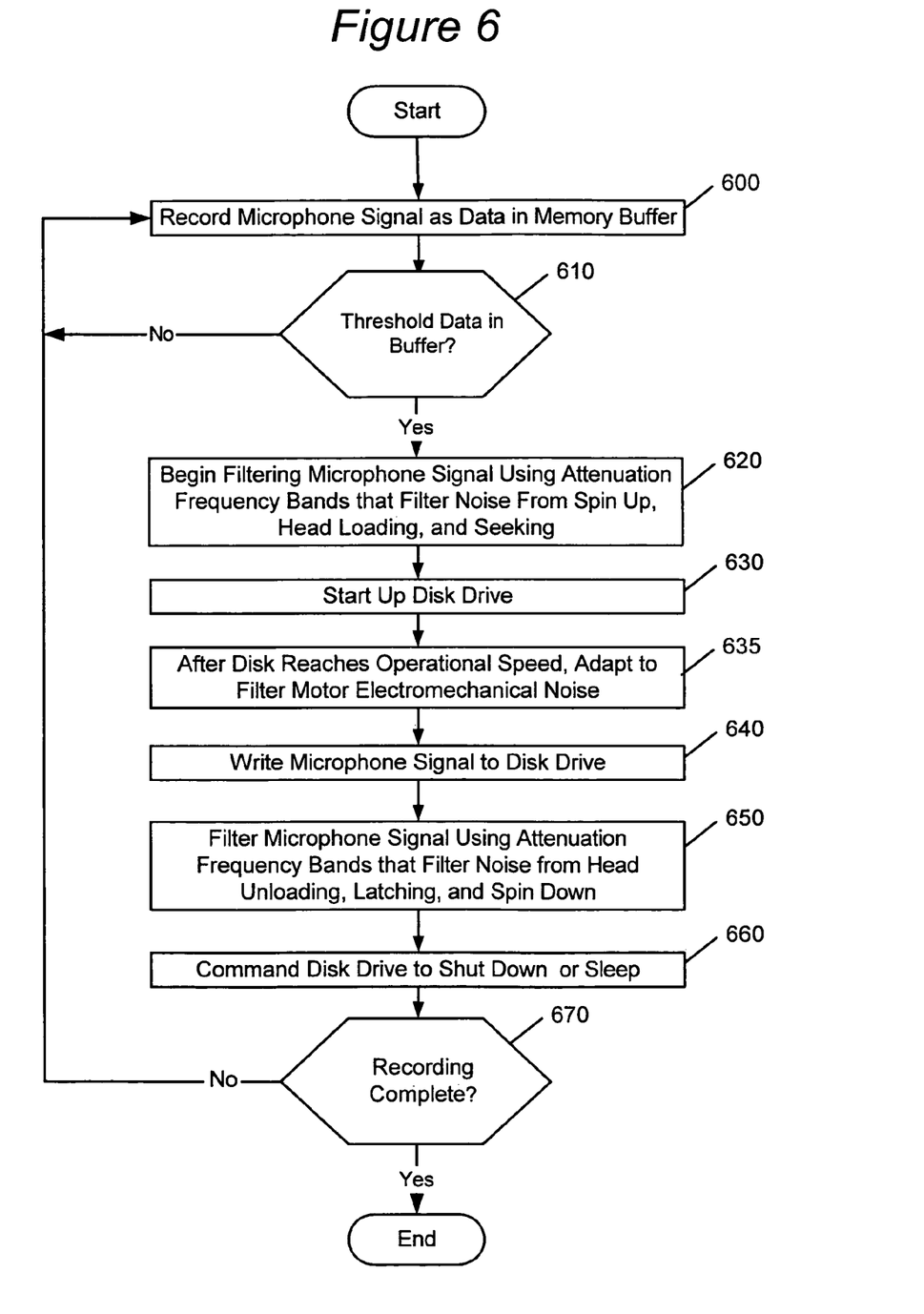
FIG. 6 is a flowchart showing methods and operations for operating a sound recording device to filter a microphone signal so as to reduce a noise component from the disk drive in accordance with some embodiments of the present invention.

FIG. 6 is a flowchart showing exemplary methods and operations for operating a sound recording device to filter a microphone signal so as to reduce a noise component from the disk drive in accordance with some embodiments of the present invention. The microphone signal is recorded at Block 600 as data in a memory buffer. When a threshold amount of data has been buffered to allow efficient writing a defined number of blocks on the disk drive, as decided at Block 610, a filter is activated to begin filtering (Block 620) the microphone signal using attenuation frequency bands that filter noise from spin up, unlatching, head loading, and seek. The disk drive is commanded at Block 630 to wake up. When the disk 12 reaches operational speed, at Block 635, the filter is adapted to filter electromechanical noise caused by the spin motor 14, such as from commutation noise and/or rotor/stator eccentricity related noise. A selected portion of the buffered microphone signal is written at Block 640 to the disk drive, and may contain a combination of an unfiltered microphone signal which was recorded into the buffer while the disk drive was in a sleep mode and a filtered microphone signal recorded while the disk drive was active. After the selected portion of the buffered microphone signal is written to the disk drive, the microphone signal is then filtered at Block 650 using attenuation frequency band(s) that filter head unloading and latching noise and spin down motor noise. The disk drive is commanded to shut down or sleep at Block 660. When the sound recording is not complete (e.g., a user has not yet disabled recording), the operations of Blocks 600 to 660 repeat to carry out further sound recording.

Figure 7:
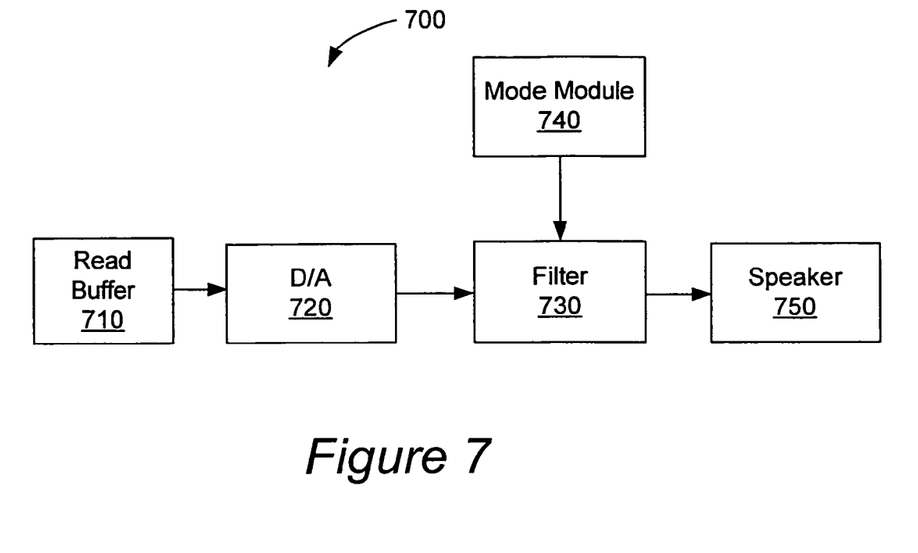
FIG. 7 is a block diagram of a sound playback circuit and associated methods in accordance with some embodiments of the present invention.

During playback of sound stored on the disk drive 10, the disk drive 10 may induce noise into the playback signal (e.g., into the analog signal that is amplified and played through speaker). Accordingly, in some embodiments, the noise from the disk drive 10 is filtered during playback of recorded sound. FIG. 7 is a simplified block diagram of a circuit 700 and associated methods that may be used to filter noise playback of sound from the disk drive 10. The circuit 700 includes a read buffer 710 that stores data from the disk drive 10, a digital-to-analog (D/A) converter 720, a filter 730, a mode module 740, and a speaker 750. During playback of sound data from the disk drive 10, the D/A converter 720 converts the data to an analog signal. The filter 730 filters the analog signal to remove electrical noise induced into the analog signal by the disk drive. The filter 730 can be configured to adapt its filtering of the analog signal in response to changing phases of the disk drive 10, such as explained above for filter 310 of FIG. 3. The filtered analog signal is provided to the speaker 750 for playback to a user. The filtering may be carried out before and/or after amplification of the analog signal by an amplifier (not shown).

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A sound recording device comprising:
   a disk drive that is configured to write data on a rotatable data storage disk therein;
   a microphone that is configured to generate a microphone signal, the microphone signal including a desired sound component and a noise component from the noise that is generated by the disk drive; and
   a controller that is configured to filter the microphone signal to reduce the noise component from the disk drive relative to the desired component, and to control the disk drive to write data based on the filtered microphone signal on the disk, the controller being configured to obtain an identifier from the disk drive that is indicative of noise characteristics of the disk drive, and to adapt its filtering of the microphone signal to reduce the noise component in response to the obtained identifier.

2. A method of operating a sound recording device that comprises a microphone and a disk drive, the method comprising:
   receiving a microphone signal from the microphone, the microphone signal including a desired sound component and a noise component from noise that is generated by the disk drive;
   filtering the microphone signal to reduce the noise component from the disk drive relative to the desired sound component, the filtering including passing the microphone signal through a notch filter to attenuate the microphone signal within one or more frequency bands that are defined based on characteristics of noise generated by the disk drive, the passing including attenuating the microphone signal at least at a fundamental frequency of noise generated during latching of a head of the disk to prevent movement relative to the disk; and
   wherein filtering the microphone signal to reduce the noise component from the disk drive relative to the desired component further comprises:
      obtaining an identifier from the disk drive that is indicative of noise characteristics of the disk drive; and
      adapting the filtering of the microphone signal to reduce the noise component in response to the obtained identifier.

3. The method of claim 2, wherein passing the microphone signal through a notch filter further comprises attenuating the microphone signal at least at a fundamental frequency of noise generated during seeking of a head of the disk drive between tracks on the disk.

4. The method of claim 2, wherein passing the microphone signal through a notch filter further comprises attenuating the microphone signal at least at a fundamental frequency of noise generated during spin up of the disk from rest to an operational speed, while maintaining the disk at the operational speed, and during spin down of the disk from the operational speed to rest.

5. The method of claim 2, wherein passing the microphone signal through a notch filter comprises attenuating the microphone signal at least at a fundamental frequency of noise generated during unlatching of the head.

6. The method of claim 2, wherein the notch filter has a variable notch frequency for attenuation, and the method comprises varying the notch frequency of the notch filter to correspond to changes in the frequency of the noise component as the disk is spun up from rest to an operational speed and spun down from the operational speed to rest.

7. The method of claim 2, wherein filtering the microphone signal to reduce the noise component from the disk drive relative to the desired sound component comprises:
  initiating the filtering in response to the disk drive changing from a first state to a second state; and
  ceasing filtering in response to the disk drive changing from the second state to a third state, wherein the first, second, and third states are different ones of a group comprising an idle state in which a disk of the disk drive is at rest, a spin up state in which the disk is spun up from rest to an operational speed, a read/write state in which data is read/written on the disk through a head, a latching state in which the head is latched to prevent movement, an unlatching state in which the head is unlatched, and a command completion state in which the disk drive completes a read/write command.

8. The method of claim 2, wherein filtering the microphone signal to reduce the noise component from the disk drive relative to the desired sound component comprises:
  sampling a microphone signal from the microphone with a variable sampling rate that is selectable in response to a control signal to generate a digital microphone signal; and
  adapting the filtering of the digital microphone signal to reduce the noise component in response to a selected sampling rate of the microphone signal.

9. The method of claim 2, further comprising encoding the filtered microphone signal with a variable coding rate that is selectable in response to a control signal to generate an encoded audio signal, and wherein filtering the microphone signal to reduce the noise component from the disk drive relative to the desired sound component comprises adapting the filtering of the microphone signal to reduce the noise component in response to a selected coding rate at which the filtered microphone signal is encoded.

10. The method of claim 2, wherein the notch filter has tunable filter characteristics, and wherein filtering the microphone signal to reduce the noise component from the disk drive relative to the desired sound component comprises tuning the notch filter to attenuate first characteristics of the microphone signal in response to anticipation of spin up of the disk from rest, wherein the first characteristics of the microphone signal correspond to noise associated with the spin up of the disk.

11. The method of claim 10, wherein filtering the microphone signal to reduce the noise component from the disk drive relative to the desired sound component further comprises tuning the filter to attenuate second characteristics of the microphone signal, which are different from the first characteristics of the microphone signal, in response to anticipation of seeking a head between tracks of the disk to read and/or write data on a selected track on the disk, wherein the second characteristics of the microphone signal correspond to noise associated with movement of the head during seeking between tracks.

12. A method of operating a sound recording device that comprises a microphone and a disk drive, the method comprising:
  receiving a microphone signal from the microphone, the microphone signal including a desired sound component and a noise component from noise that is generated by the disk drive;
  filtering the microphone signal to reduce the noise component from the disk drive relative to the desired sound component, the filtering including passing the microphone signal through a notch filter to attenuate the microphone signal within one or more frequency bands that are defined based on characteristics of noise generated by the disk drive, the passing including attenuating the microphone signal at least at a fundamental frequency of noise generated during latching of a head of the disk to prevent movement relative to the disk; and
  wherein filtering the microphone signal to reduce the noise component from the disk drive relative to the desired component further comprises:
    analyzing the microphone signal to identify characteristics of the noise component from the disk drive; and
    adapting the filtering of the microphone signal to reduce the noise component in response to the identified characteristics.

13. The method of claim 12, wherein passing the microphone signal through a notch filter further comprises attenuating the microphone signal at least at a fundamental frequency of noise generated during seeking of a head of the disk drive between tracks on the disk.

14. The method of claim 12, wherein passing the microphone signal through a notch filter further comprises attenuating the microphone signal at least at a fundamental frequency of noise generated during spin up of the disk from rest to an operational speed, while maintaining the disk at the operational speed, and during spin down of the disk from the operational speed to rest.

15. The method of claim 12, wherein passing the microphone signal through a notch filter comprises attenuating the microphone signal at least at a fundamental frequency of noise generated during unlatching of the head.

16. The method of claim 12, wherein the notch filter has a variable notch frequency for attenuation, and the method comprises varying the notch frequency of the notch filter to correspond to changes in the frequency of the noise component as the disk is spun up from rest to an operational speed and spun down from the operational speed to rest.

17. The method of claim 12, wherein filtering the microphone signal to reduce the noise component from the disk drive relative to the desired sound component comprises:
  initiating the filtering in response to the disk drive changing from a first state to a second state; and
  ceasing filtering in response to the disk drive changing from the second state to a third state, wherein the first, second, and third states are different ones of a group comprising an idle state in which a disk of the disk drive is at rest, a spin up state in which the disk is spun up from rest to an operational speed, a read/write state in which data is read/written on the disk through a head, a latching state in which the head is latched to prevent movement, an unlatching state in which the head is unlatched, and a command completion state in which the disk drive completes a read/write command.

18. The method of claim 12, wherein filtering the microphone signal to reduce the noise component from the disk drive relative to the desired sound component comprises:
sampling a microphone signal from the microphone with a variable sampling rate that is selectable in response to a control signal to generate a digital microphone signal; and
adapting the filtering of the digital microphone signal to reduce the noise component in response to a selected sampling rate of the microphone signal.

19. The method of claim 12, further comprising encoding the filtered microphone signal with a variable coding rate that is selectable in response to a control signal to generate an encoded audio signal, and wherein filtering the microphone signal to reduce the noise component from the disk drive relative to the desired sound component comprises adapting the filtering of the microphone signal to reduce the noise component in response to a selected coding rate at which the filtered microphone signal is encoded.

20. The method of claim 12, wherein the notch filter has tunable filter characteristics, and wherein filtering the microphone signal to reduce the noise component from the disk drive relative to the desired sound component comprises tuning the notch filter to attenuate first characteristics of the microphone signal in response to anticipation of spin up of the disk from rest, wherein the first characteristics of the microphone signal correspond to noise associated with the spin up of the disk.

21. The method of claim 20, wherein filtering the microphone signal to reduce the noise component from the disk drive relative to the desired sound component further comprises tuning the filter to attenuate second characteristics of the microphone signal, which are different from the first characteristics of the microphone signal, in response to anticipation of seeking a head between tracks of the disk to read and/or write data on a selected track on the disk, wherein the second characteristics of the microphone signal correspond to noise associated with movement of the head during seeking between tracks.

* * * * *